(12) United States Patent
Shah et al.

(10) Patent No.: US 9,288,140 B2
(45) Date of Patent: Mar. 15, 2016

(54) MULTICHASSIS FAILOVER AND RECOVERY FOR MLPPP WIRELESS BACKHAUL

(75) Inventors: Chirayu A. Shah, Fremont, CA (US); Sasha Cirkovic, San Francisco, CA (US)

(73) Assignee: CORIANT OPERATIONS, INC., Naperville, IL (US)

( * ) Notice: Subject to any disclaimer, the term of this patent is extended or adjusted under 35 U.S.C. 154(b) by 329 days.

(21) Appl. No.: 13/544,723

(22) Filed: Jul. 9, 2012

(65) Prior Publication Data

US 2014/0010073 A1 Jan. 9, 2014

(51) Int. Cl.
*H04L 12/703* (2013.01)
*H04L 12/775* (2013.01)
*H04L 12/707* (2013.01)

(52) U.S. Cl.
CPC .............. *H04L 45/28* (2013.01); *H04L 45/24* (2013.01); *H04L 45/58* (2013.01)

(58) Field of Classification Search
CPC ............. H04L 47/728; H04L 41/0654; H04L 2012/5625
USPC .......................................................... 370/228
See application file for complete search history.

(56) References Cited

U.S. PATENT DOCUMENTS

| | | | |
|---|---|---|---|
| 7,518,986 B1 | 4/2009 | Chadalavada et al. | 370/218 |
| 7,804,769 B1 | 9/2010 | Tuplur et al. | 370/218 |
| 7,843,814 B2 | 11/2010 | McConnochie et al. | |
| 7,865,576 B2 | 1/2011 | Regan et al. | 709/219 |
| 7,899,930 B1 | 3/2011 | Turner et al. | 709/238 |
| 8,149,691 B1 | 4/2012 | Chadalavada et al. | 370/219 |
| 8,194,534 B2 | 6/2012 | Pandey et al. | 370/216 |
| 8,259,713 B2 | 9/2012 | Lawrence et al. | 370/388 |
| 8,284,656 B2 | 10/2012 | Saha et al. | 370/219 |
| 8,295,181 B2 | 10/2012 | Bradford et al. | 370/236 |
| 8,300,523 B2 | 10/2012 | Salam et al. | 370/220 |
| 8,370,831 B1 | 2/2013 | Eng et al. | 717/178 |
| 8,483,048 B2 | 7/2013 | Tuplur et al. | 370/218 |
| 2003/0167343 A1* | 9/2003 | Furuno | 709/244 |
| 2006/0047850 A1 | 3/2006 | Bhasin et al. | 709/238 |

(Continued)

FOREIGN PATENT DOCUMENTS

| | | |
|---|---|---|
| EP | 1026918 B1 | 10/2004 |
| EP | 1 793 542 A2 | 6/2007 |

(Continued)

OTHER PUBLICATIONS

U.S. Appl. No. 13/594,156, filed Aug. 24, 2012.

*Primary Examiner* — Ian N Moore
*Assistant Examiner* — Mewale Ambaye
(74) *Attorney, Agent, or Firm* — Fitzpatrick, Cella, Harper & Scinto

(57) ABSTRACT

A procedure, and an apparatus, system and computer program that operate in accordance with the procedure, for operating a dual homed communications network. In the procedure, a backup aggregation node is configured in accordance with a configuration of a primary multi-service router. A failure is detected in a first communication path that includes a primary multi-service router. In response to the detection, a second, backup communication path is activated that includes a backup multi-service router. In response to the activation, a router is negotiated with so that traffic forwarded by the router is provided to the second, backup communication path instead of the first communication path.

22 Claims, 4 Drawing Sheets

(56) References Cited

U.S. PATENT DOCUMENTS

| | | | |
|---|---|---|---|
| 2006/0252410 A1* | 11/2006 | Bakita et al. | 455/411 |
| 2009/0024722 A1 | 1/2009 | Sethuraman et al. | |
| 2009/0161535 A1 | 6/2009 | Saha | |
| 2010/0315946 A1* | 12/2010 | Salam et al. | 370/222 |
| 2011/0013508 A1 | 1/2011 | Tuplur et al. | 370/218 |
| 2012/0195189 A1* | 8/2012 | Wang et al. | 370/225 |
| 2012/0239966 A1 | 9/2012 | Kompella et al. | |
| 2012/0275297 A1 | 11/2012 | Subramanian | 370/225 |
| 2012/0314597 A1 | 12/2012 | Singh et al. | |
| 2012/0315906 A1 | 12/2012 | Stephens | |
| 2012/0324086 A1 | 12/2012 | Brzozowski | |
| 2013/0111095 A1 | 5/2013 | Mehrotra et al. | 710/301 |

FOREIGN PATENT DOCUMENTS

| | | |
|---|---|---|
| EP | 1 854 250 A2 | 11/2007 |
| EP | 2 122 917 A2 | 11/2009 |
| EP | 1671440 B1 | 2/2010 |
| WO | 2006/026708 A2 | 3/2006 |
| WO | 2006/093929 A2 | 9/2006 |
| WO | 2008/093307 A2 | 8/2008 |
| WO | 2011/143893 A1 | 11/2011 |
| WO | 2012/149105 A1 | 11/2012 |

* cited by examiner

MULTICHASSIS FAILOVER AND RECOVERY FOR MLPPP WIRELESS BACKHAUL

BACKGROUND OF THE INVENTION

1. Field of the Invention

The exemplary embodiments described herein relate to communication network, and, more particularly, a method, system, apparatus, and computer program that provide improved network performance and reliability using a dual homing network configuration.

2. Description of Related Art

A high-speed network environment typically includes network devices such as access switches, routers, and bridges used to facilitate delivery of information packets and/or data traffic from source devices to destination devices. Information pertaining to the transfer of packet(s) through the network is usually embedded within the packet itself Each packet traveling through one or more communications networks such as Internet and/or Ethernet can typically be handled independently from other packets in a packet stream or traffic. For example, each router processes incoming packets and determines where the packet(s) should be forwarded.

The wireless backhaul network has grown such that many more users are terminating on nodes at mobile switching center locations. If the terminating nodes fail, service to such users may be disrupted if a backup node is not used.

For multi link point to point protocol (ML-PPP) backhauls, the telecommunications industry has developed a multi-chassis automatic protection switching (APS) mechanism that adds capital and operational expense to the service provider.

SUMMARY

The above and other limitations are overcome by a procedure, and by an apparatus, system and computer program that operate in accordance with the procedure, for operating a dual homed communications network. In accordance with one example embodiment herein, the procedure comprises configuring a backup multi-service router in accordance with a configuration of a primary multi-service router. The procedure also comprises detecting a failure in a first communication path that includes the primary multi-service router and activating a second, backup communication path that includes the backup multi-service router, in response to the detecting. The procedure also comprises, in response to the activating, negotiating with a router so that traffic forwarded by the router is provided to the second, backup communication path instead of the first communication path.

In accordance with another example aspect herein, the system comprises a backup multi-service router interposed in a backup communication path. The backup multi-service router includes a memory storing program instructions, and a processor. The processor operates under control of the program instructions, for (a) changing an operating state of the backup multi-service router in response to receiving information over the backup communication path as a result of a failure in a working communication path that includes a primary multi-service router, and (b) negotiating with a router so that traffic forwarded by the router is provided to the backup communication path instead of the working communication path.

In accordance with still another aspect herein, the system comprises

Additional features and benefits of the exemplary embodiments will become apparent from the detailed description, figures and claims set forth below.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, wherein:

DETAILED DESCRIPTION

Exemplary embodiments herein relate to a method, apparatus, and system using dual homing protection. Dual homing networking can improve reliability of network services.

Those of ordinary skill in the art will realize in view of this description that the following detailed description of the exemplary embodiments is illustrative only and is not intended to be in any way limiting. Other embodiments will readily suggest themselves to such skilled persons having the benefit of this disclosure. Reference will now be made in detail to implementations of the exemplary embodiments as illustrated in the accompanying drawings. The same reference numbers will be used throughout the drawings and the following detailed description to refer to the same or like parts.

Figure 1:
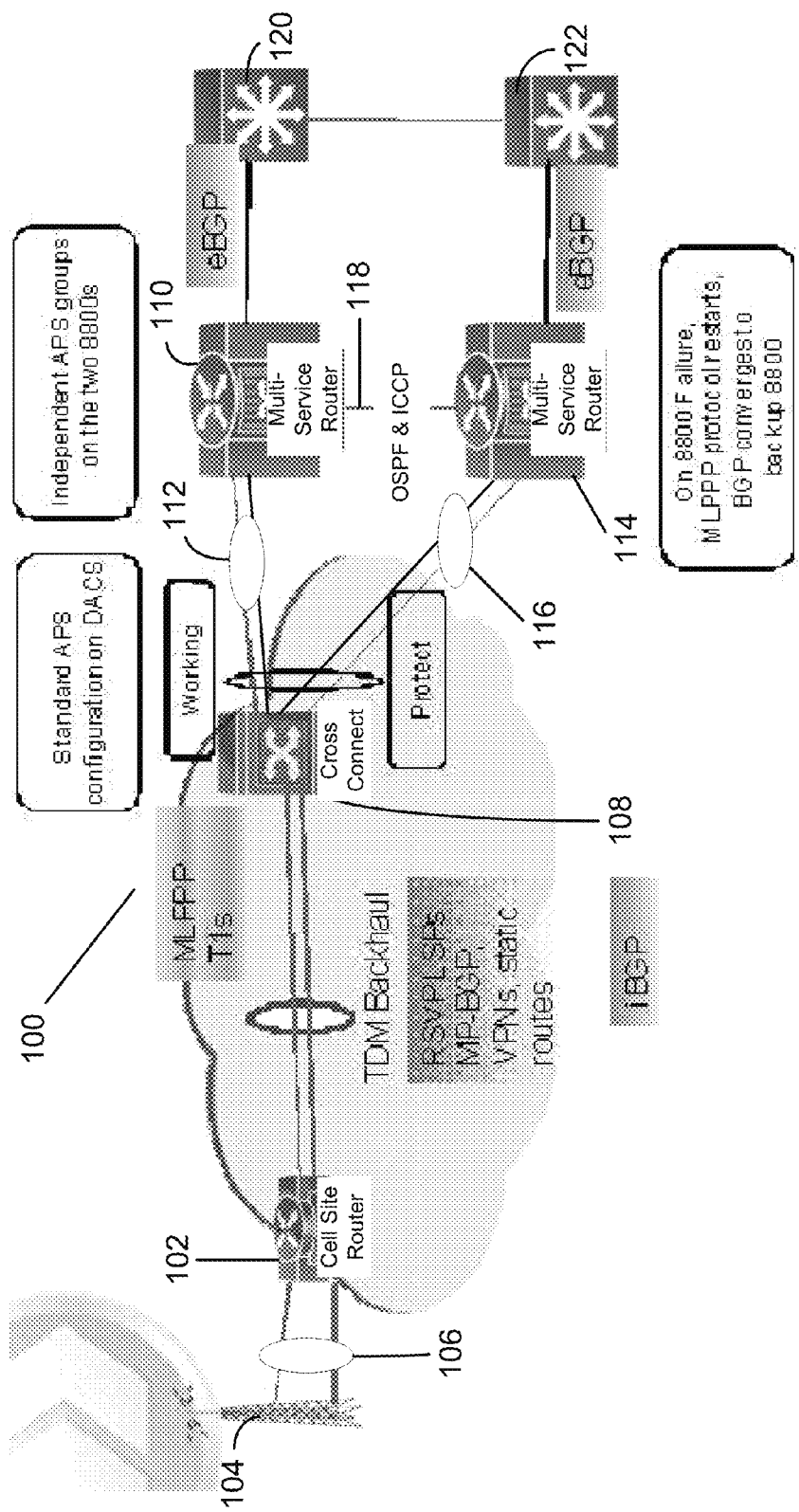
FIG. 1 is schematic illustration of a wireless backhaul network which includes a multi-chassis failover architecture, in accordance with an aspect herein.

FIG. 1 shows a schematic representation of a wireless backhaul network 100 which includes a multi-chassis failover architecture, in accordance with an example aspect herein. The network 100 includes a cell site access router 102, such as the Tellabs 8605 cell site router, connected to a cell site 104 TDM backhaul via a set of backhaul links 106 that carry network traffic. The cell site access router 102 is connected to a cross connect 108, such as the Tellabs DACS 5500 digital cross connect system. The cross connect 108 is connected to a primary multi-service router 110, such as a Tellabs 8800 multi-service router, via a working path 112 and is connected to a backup multi-service router 114, such as a Tellabs 8800 multi-service router, via a protected path 116. In one example embodiment the working path 112 and the protected path 116 include ML-PPP bundles of PPP links. Also, in one example embodiment, access router 102 is connected to the cross connect 108 by an ML-PPP bundle of PPP links, such as a pair of T1 lines.

The primary and backup multi-service routers, 110 and 114, communicate via a 118 for synchronization purposes, as described further below, such as by using one or more protocols, such as, Interior Gateway Protocol ("IGP"), Open Shortest Path Protocol (OSPF), and Inter Chassis Control Protocol (ICCP). Also, the network includes routers 120 and 122, which may communicate with the primary and backup multi-service routers, 110 and 114, using External Border Gateway Protocol (eBGP). Though not shown in FIG. 1, routers 120 and 122 may be in further communication with a Radio Network Controller ("RNC", not shown) via further connections which include land line connections, wireless connections, or a combination of wired and wireless connections.

Cell site 104, also known as a base station, may include a radio tower, a computer (not shown), and a server (not shown). Though not shown, the cell site 104 may be further connected to a cellular phone and a handheld device connected via wireless communications. Base station or cell site 104 is capable of communicating with mobile devices such as a cellular phone and a handheld device via the radio tower. It should be noted that cell site 104 may include additional radio towers as well as other land switching circuitry, not shown in FIG. 1. Cell stations, such as cell site 104 can be configured to support wireless communications, as well as wired communications.

The primary multi-service router 110 and backup multi-service router 114 are organized in a dual homing configuration with the cross connect 108 in accordance with one example embodiment herein. Dual homed redundancy, also known as dual homing, provides two independent data paths, such as the aforementioned working path 112 and the protected path 116 corresponding to each of the dual attached multi-service routers 110 and 114. Under normal conditions, the cross connect 108 transmits data packets to and from primary multi-service router 110 via the primary, working path 112. In the event that primary path 112 or primary multi-service router 110 fails, the cross connect 108 switches its connection from primary multi-service router 110 to backup multi-service router 114, whereby cross connect 108 can continue network services via the backup, protected path 116.

In one embodiment, when primary multi-service router 110 recovers from an earlier crash or failure, cross connect 108 learns of the recovery and sends instructions to the backup multi-service router 114 to revert back to the backup state so that communication can resume through the primary multi-service router 110. Thus, the system 100 is constructed to route network traffic along the working path 112 unless there is a detected failure in the working path 112 or the primary multi-service router 110. If there is a failure in the working path 112 or the primary multi-service router 110, the traffic is rerouted along the protected path 116 and through the backup multi-service router 114, as described in further detail herein.

At an initial state, traffic is not being routed to either the primary multi-service router 110 or the backup multi-service router 114. For example, at system startup, the multi-service routers 110 and 114 may both be powered up at the same time. An initialization process configures the system 100 and establishes traffic routing from the cell site router 102 to the primary multi-service router 110 and initializes the backup multi-service router 114, as outlined in FIG. 2. Initially, at block S200 the ML-PPP states of the primary and backup multi-service routers 110 and 114 are initialized to a working state and a passive state, respectively. In the passive state, the backup multi-service router 114 listens to network traffic on the primary working path 112 which is forwarded in duplicate by the cross connect 108 to the backup multi-service router 114 in addition to node 110.

At block S202, the cross connect 108 monitors whether the communication path that includes the primary multi-service router 110 and working path 112 has failed. In one example embodiment herein, the cross connect 108 can make a determination as to whether there is a failure in a path by using the APS mechanism, and can carry out a switchover procedure in accordance with a standard APS mechanism, in the event of a detection, although other failure detection and switchover mechanisms can be used in other embodiments.

If the cross connect 108 determines that the primary multi-service router 110 or the working path 112 has failed (YES at S202) then a failure scenario is initiated at block S214. In one example embodiment where the working path 112 includes an ML-PPP bundle of PPP links, the APS mechanism is arranged to determine that a failure exists in the working path 112 if a plurality or all of the links of the ML-PPP bundle are detected as being failed links. If the cross connect 108 determines that the primary multi-service router 110 or the working path 112 has not failed (NO at block S202), then the cell site router 102 initiates an negotiation process at block S204 by exchanging LCP and IPCP messages of the standard MLPPP protocol state machine. In one embodiment, the LCP message includes a request for primary multi-service router 110 to provide the cell site router 102 with layer 2 point-to-point protocol (PPP) parameters, such as MRRU—Multilink Maximum Received Reconstructed Unit, Magic number, Protocol-Field-Compression (PFC) and Address-and-Control-Field-Compression (ACFC), Multilink PPP, associated with the configuration of the primary multi-service router 110.

At block S206 the primary multi-service router 110 configures itself based on the exchanged LCP and IPCP messages at block S204 and sends a response back to the cell site router 102. In responding to the cell site router 102, the primary multi-service router 110 also communicates its IP address to cell site router 102 according to the IPCP protocol. The cross connect 108 forwards all network traffic, also including the LCP and IPCP messages, to the backup multi-service router 114 (in addition to node 110), which listens to the forwarded traffic. The backup multi-service router 114 at block S208 configures its layer 2 PPP parameters to match those of the primary multi-service router 110 based on the LCP and IPCP messages sent from the primary node to the cell site router listened to by the backup multi-service router 114. Also, at block S208, the backup multi-service router 114 stores its configured parameters, along with its assigned IP address, but does not activate its IP interface, so as to remain in a passive listening state by listening to the traffic received from cross connect 108 over protected path 116. The IP address of the multi-service router 114 is pre-provisioned by the network system operator. Once the negotiation process begun a block S204 is completed between the primary multi-service router 110 and the cell site router 102, data traffic is routed between the cell site router 102 and the primary multi-service router 110 via the primary working path 112 at block S210, and the data traffic continues to also be copied and routed by cross connect 108 to the backup multi-service router 114 whereupon the traffic is discarded by the backup multi-service router 114.

In one example, the cross connect 108 is provisioned to use an APS mechanism to detect a failure of the path including the primary multi-service router 110 and the path including the backup multi-service router 114, when those nodes are respectfully in an active state. In one example embodiment where the working path 112 and the backup path 116 each include ML-PPP bundles of PPP links, the APS mechanism is arranged to determine that a failure exists if a plurality or all of the links of the ML-PPP bundles are detected as being failed links. While in at least some existing multi-chassis systems, primary and backup routers continuously exchange state information in order to monitor for failures, in the present example embodiment herein, on the other hand, failure detection is performed by cross connect 108, thus eliminating the need for the continuous exchange of information between the primary and backup routers. As a result, the present example embodiment offers reduced complexity in the synchronization of state information by the primary and backup multi-service routers 110 and 114, respectively.

Cross connect 108 checks at block S212 for a failure in the path including the primary multi-service router 110 (and working path 112). If no failure is detected at block S212 (NO at S212), then traffic continues to be routed in the above manner towards the primary multi-service router 110 and the backup multi-service router 114, the latter of which remains in the passive listening state. If a failure is detected (YES at S212), then a failure scenario is initiated at block S214.

Figure 2:
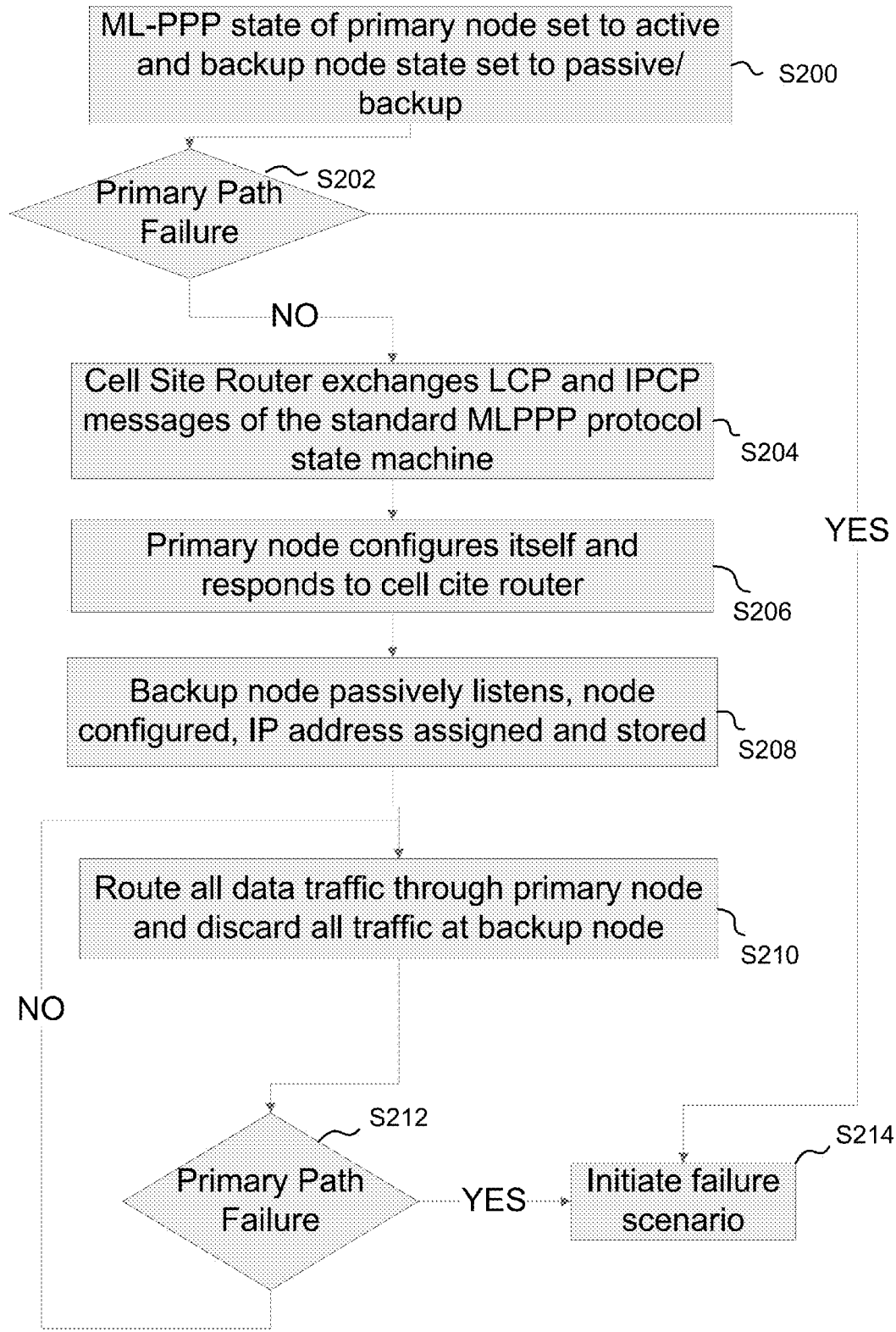
FIG. 2 is a flow diagram of an initialization process, in accordance with an aspect herein.
Figure 3:
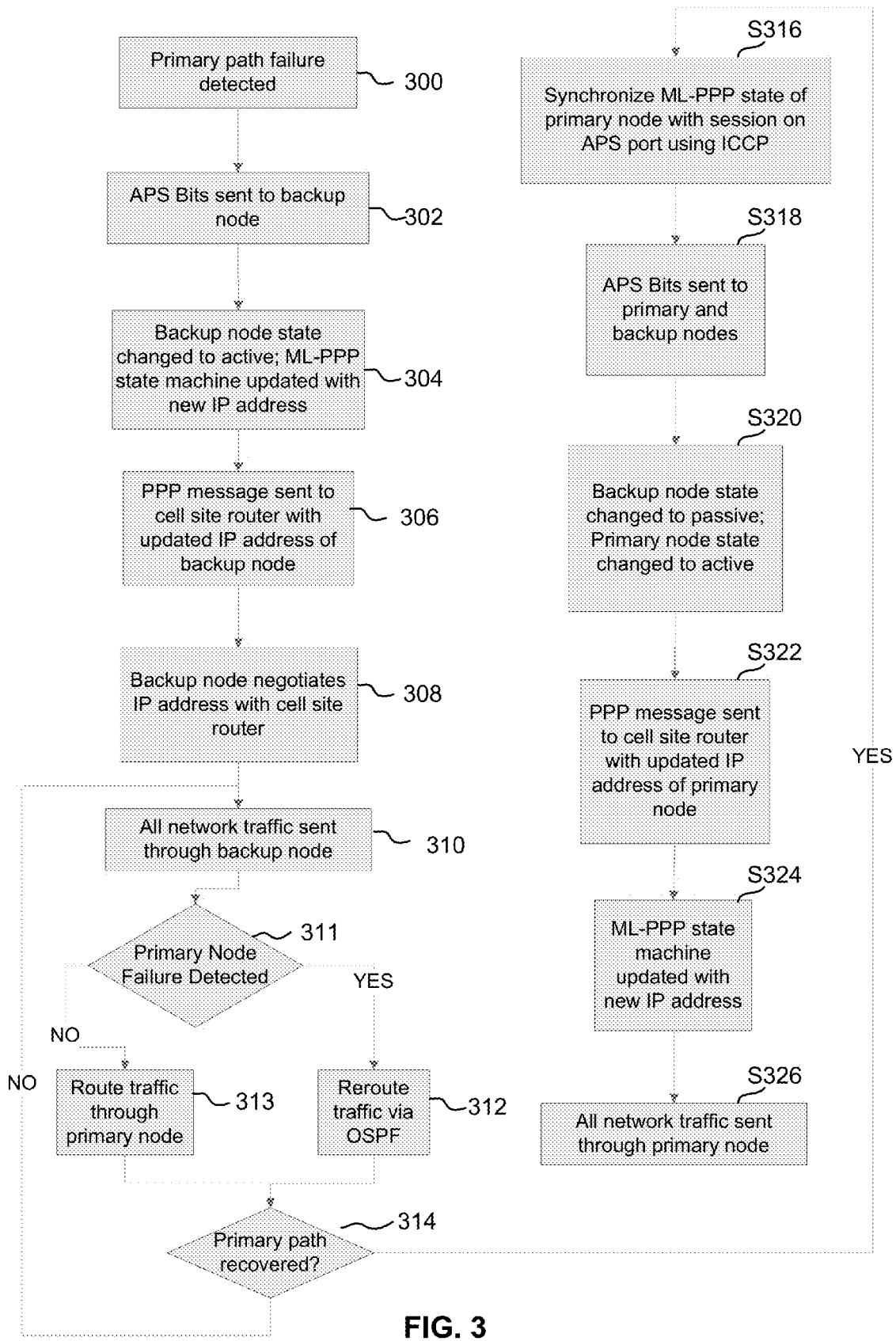
FIG. 3 is a flow diagram of a backup and recovery process, in accordance with an aspect herein.

FIG. 3 is a flow diagram representing an example of the failure scenario referred to in FIG. 2 at block S214. At block S300 (which further represents the YES condition of block S212, and subsequently block S214) a failure of the primary multi-service router 110 and/or the working path 112 is/are detected by the cross connect 108. At block S302 the cross connect 108 transmits one or more APS bits (e.g., K1, K2) to the backup multi-service router 114, notifying the backup multi-service router 114 to switch its state from passive to working At block S304 the backup multi-service router 114 changes its state (e.g., ML-PPP state machine) to working and activates its IP interface using its stored IP address. At block S306, a PPP message is sent from the backup multi-service router 114 to the cell site router 102 to update the cell site router 102 with the changed IP address (the IP address of node 114) for purposes of routing traffic. To permit the negotiation of the IP address of the backup multi-service router 114, that IP address is included in fields of the PPP message reserved for vendor-specific information, in one example embodiment. Formatted PPP messages may include fields that are reserved for use by various hardware vendors, such as, for example, to designate parameters relevant to vendor specific hardware sending or receiving such a formatted message.

The cell site router 102 can use the IP address received by the router 102 in such a PPP message to route traffic to the backup multi-service router 114, based on that IP address, instead of the address of the primary multi-service router 110. For example, at block S308 the cell site router 102 updates the forwarding IP address from that of the primary multi-service router 110 to that of the backup multi-service router 114. Thus, a negotiation process including one or more of blocks S306 and S308 can be performed to facilitate communication between the backup multi-service router 114 and the cell site router 102. All network traffic that was routed by cross connect 108 along working path 112 is then rerouted by cross connect 108 through the backup path 116 and backup multi-service router 114 at block S312.

At block S311, the backup multi-service router 114 detects whether or not there is a failure of the primary multi-service router 110 and/or link 118, which would prevent an exchange of ICCP messages between the primary multi-service router 110 and the backup multi-service router 114. Detection of failure of the primary multi-service router 110 and/or link 118 can be made by the backup multi-service router 114 using an OSPF protocol employed by the backup multi-service router 114 based on OSPF hello packets. Alternatively, detection of failure of the primary multi-service router 110 and/or link 118 can be made by the backup multi-service router 114 based on bidirectional forwarding detection (BFD) employed by the backup multi-service router 114. If a failure of the primary multi-service router 110 and/or link 118 is not detected by the backup multi-service router 114 (NO at block S311), then backup multi-service router's 114 routing information is updated at block 5313 to specify that the backup multi-service router 114 route traffic received from the cell site router 102 (by way of cross connect 108) towards router 120 by way of the primary multi-service router 110 and link 118. If a failure of the primary multi-service router 110 and/or link 118 is detected by the backup multi-service router 114 (YES at block S311), then backup multi-service router's 114 routing information is updated at block 5312 to specify that the backup multi-service router 114 route traffic received from the cell site router 102 (by way of cross connect 108) towards router 120 by way of router 122, instead of primary multi-service router 110 and link 118.

At block S314 the cross connect 108 checks to determine if the path including the primary multi-service router 110 and working path 112 recovered (i.e., the failure of the working path 112 has been removed and/or the failure of the primary multi-service router 110 has been cleared by shutting down and restarting itself). In one example embodiment where the working path 112 includes an ML-PPP bundle of PPP links, the APS mechanism is arranged to determine that a recovery exists if a plurality or all of the links of that ML-PPP bundle are detected as being recovered links. If the path including the primary multi-service router 110 and/or the working path 112 did not recover (NO at S314), then control passes back to block S312 where the backup multi-service router 114 remains in an active state and network traffic continues to be routed through the backup multi-service router 114 and the protected path 116. However, if the path including the primary multi-service router 110 and/or the working path 112 recovers (YES at S314), then a recovery process occurs beginning at block S316.

At block S316 the ML-PPP state of the primary multi-service router 110 is synchronized with session information of the backup multi-service router 114 on the APS port using ICCP over the synchronization link 118. The system can be configured so that the restart of the primary multi-service router 110 triggers such synchronization. The synchronized information is sent via the synchronization link 118 between the primary and backup multi-service routers 110 and 114. The synchronization with the backup multi-service router 114 enables the primary multi-service router 110 to know how to route all of the traffic that was formerly being routed by the backup multi-service router 114 as well as routing of traffic to and from the routers 120 and 122. At block S318 APS bits (e.g., K1, K2) are sent by the cross connect 108 to the primary and backup multi-service routers 110 and 114. At block S320 the APS bits are received at each of the primary and backup multi-service routers 110 and 114 and, in response, the state of the backup multi-service router 114 is changed to passive and the primary multi-service router's state is changed to working At block S322 the primary multi-service router 110 sends its IP address in a PPP message to the cell site router 102 by adding its IP address in vendor specific fields of the message in the same manner as described above for block S306. Based on the IP address sent in the PPP message by the primary multi-service router 110, at block S324 an ML-PPP state machine of the cell site router 102 is updated to reflect that the IP address of the forwarding multi-service router has changed to that of the primary multi-service router 110. At block S326 network traffic is routed back through the primary working path 112 and primary multi-service router 110, versus through node 114 and backup path 116, so that the system returns to the state described at block S210 in FIG. 2.

Figure 4:
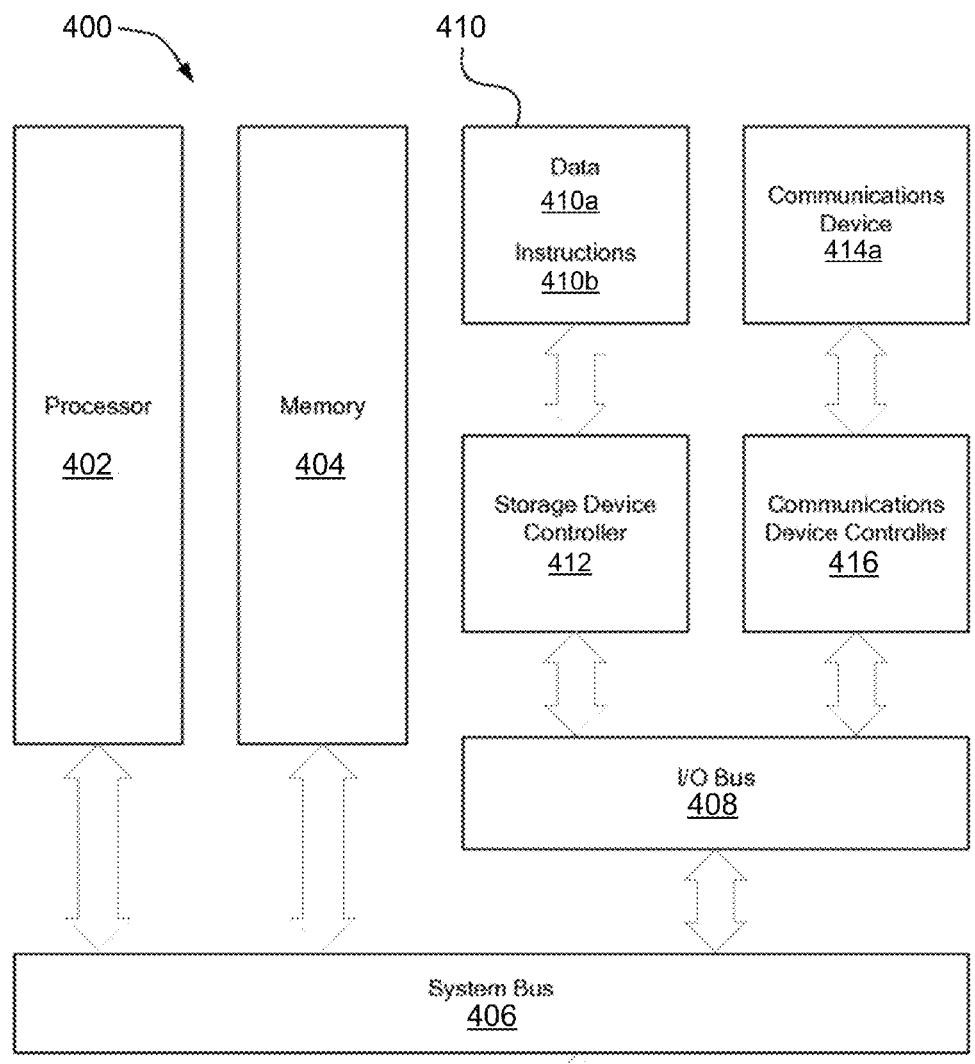
FIG. 4 is an architecture diagram of a processing system, in accordance with an aspect herein.

Having described an example procedure herein, reference is now made to FIG. 4, which is an architecture diagram of an example data processing system 400, which in one example embodiment, can further represent a primary multi-service router and/or a backup multi-service router, and/or one or more of the cell site router, cross connect, and other nodes of FIG. 1. Data processing system 400 includes a processor 402 coupled to a memory 404 via system bus 406. Processor 402 is also coupled to external Input/Output (I/O) devices via the system bus 406 and an I/O bus 408, and at least one input/output user interface 418. Processor 402 may be further coupled to a communications device 414 via a communications device controller 416 coupled to the I/O bus 408. Processor 402 may be further coupled to additional communications devices (not shown), such as another communications device controller coupled to the I/O bus 408. Processor 402 uses the communications device(s) (e.g., 414) to communicate with other elements of a network, such as, for example, network nodes, and the communications devices may have one or more input and output ports. Processor 402 also can include an internal clock (not shown) to keep track of time, periodic time intervals, and the like.

A storage device (memory) 410 having a non-transitory computer readable storage medium is coupled to the processor 402 via a storage device controller 412 and the I/O bus 408 and the system bus 406. The storage device 410 is used by the processor 402 and controller 412 to store and read/write data 410a, as well as computer program instructions 410b used to implement the procedure(s) described herein and shown in the accompanying drawing(s) herein, such as a procedure for controlling a primary multi-service router to provide failover protection, and a procedure for controlling a backup multi-service router to provide failover protection. In operation, processor 402 loads the program instructions 410b from the storage device 410 into the memory 404. Processor 402 then executes the loaded program instructions 410b to perform any of the example procedure(s) described herein, for operating the system 400. The network components mentioned above, which each may have the system architecture shown in FIG. 4, may each perform some or all of the blocks described above in connection with FIGS. 2 and 3.

In the manner described above, communication is established over the backup protected path between the cross connect node and backup multi-service router, in a case where the path including the primary multi-service router fails. Moreover, in a case where the path including the primary multi-service router recovers, communication can be restored along the path including the primary multi-service router, and the backup protected path can return to a passive, backup state.

While particular example embodiments have been shown and described, it will be obvious to those of skills in the art that, based upon the teachings herein, changes and modifications may be made to the example embodiments without departing from these embodiments and their broader aspects. Therefore, the appended claims are intended to encompass within their scope all such changes and modifications as are within the true spirit and scope of the exemplary embodiments.

What is claimed is:

1. A method for operating a dual homed communications network, comprising:
    configuring a backup multi-service router in accordance with a configuration of a primary multi-service router;
    detecting a failure in a first communication path that includes the primary multi-service router;
    activating a second, backup communication path that includes the backup multi-service router, in response to the detecting; and
    in response to the activating, negotiating with a router so that traffic forwarded by the router is provided to the second, backup communication path instead of the first communication path,
    wherein the negotiating occurs between the backup multi-service router and the router and includes (i) actively transmitting an IP address of the backup multi-service router from the backup multi-service router to the router, (ii) receiving the IP address of the backup multi-service router at the router, (iii) updating a forwarding address of the router from an IP address of the primary multi-service router to the received IP address of the backup multi-service router, and (iv) forwarding traffic from the router to the second, backup communication path using the updated forwarding address.

2. The method according to claim 1, wherein the IP address is transmitted to the router in one or more fields of a Point-to-Point Protocol (PPP) message, wherein the fields are reserved for vendor-specific information.

3. The method according to claim 1, further including changing a state of the backup multi-service router to a passive state in response to determining that there is a recovery in the first communication path.

4. The method according to claim 3, wherein in the passive state, the backup multi-service router passively receives the same network traffic as that provided in the first communication path.

5. The method according to claim 3, further comprising, in response to the recovery in the first communication path, synchronizing the primary multi-service router with the backup multi-service router.

6. The method according to claim 5, wherein the synchronizing includes using Inter-Chassis Control Protocol (ICCP) to synchronize traffic routing information between the primary multi-service router and the backup multi-service router.

7. The method of claim 1, further comprising informing the backup multi-service router of the detecting by providing the backup multi-service router with one or more automatic protection switching bits.

8. The method of claim 1, wherein the negotiating includes providing a message from the backup multi-service router to the router, the message including at least one of an IP address of the backup multi-service router, and layer 2 network parameters.

9. A system comprising:
    a backup multi-service router interposed in a backup communication path,
    wherein the backup multi-service router includes:
        a memory storing program instructions, and
        a processor, operating under control of the program instructions, for changing an operating state of the backup multi-service router in response to receiving information over the backup communication path as a result of a failure in a working communication path that includes a primary multi-service router, and negotiating with a router so that traffic forwarded by the router is provided to the backup communication path instead of the working communication path,
    wherein the negotiating occurs between the backup multi-service router and the router and includes (i) actively transmitting an IP address of the backup multi-service router from the backup multi-service router to the router, (ii) receiving the IP address of the backup multi-service router at the router, (iii) updating a forwarding address of the router from an IP address of the primary multi-service router to the received IP address of the backup multi-service router, and (iv) forwarding traffic from the router to the second, backup communication path using the updated forwarding address.

10. The system according to claim 9, wherein the processor also operates under control of the program instructions to change an operating state of the backup multi-service router in response to the backup multi-service router receiving at least one automatic protection switching bit over the backup communication path.

11. The system according to claim 9, wherein the IP address is transmitted to the router in one or more fields of a Point-to-Point Protocol (PPP) message, wherein the fields are reserved for vendor-specific information.

12. The system according to claim 9, wherein the processor also operates under control of the program instructions to change the operating state of the backup multi-service router to a passive state in response to the backup multi-service router being notified of a recovery in the working communication path.

13. The system according to claim 12, wherein while operating in the passive state, the backup multi-service router passively receives the same network traffic as that provided in the working communication path.

14. A communication system comprising:
a primary multi-service router interposed in a first communication path through which traffic is communicated;
a switch arranged to detect a failure in the first communication path and to activate a second, backup communication path, in response to the failure being detected; and
a backup multi-service router interposed in the second, backup communication path, the backup multi-service router arranged to negotiate with a router in response to activation of the second, backup communication path, such that traffic is communicated via the switch through the second, backup communication path instead of the first communication path and the primary multi-service router,
wherein the backup multi-service router and the router negotiate by (i) actively transmitting an IP address of the backup multi-service router from the backup multi-service router to the router, (ii) receiving the IP address of the backup multi-service router at the router, (iii) updating a forwarding address of the router from an IP address of the primary multi-service router to the received IP address of the backup multi-service router, and (iv) forwarding traffic from the router to the second, backup communication path using the updated forwarding address.

15. The system according to claim 14, wherein the switch is a cross connect.

16. The system according to claim 14, wherein the backup multi-service router also is arranged to change its operating state in response to the activation of the second, backup communication path.

17. The system according to claim 14, wherein the switch also is arranged to duplicate the same network traffic to the first communication path and the second, backup communication path.

18. The system according to claim 14, wherein the IP address is transmitted to the router in one or more fields of a Point-to-Point Protocol (PPP) message, the fields being reserved for vendor-specific information.

19. The system according to claim 14, wherein a synchronization path is interposed between the primary multi-service router and the backup multi-service router, the primary multi-service router and the backup multi-service router constructed to communicate via the synchronization path in response to the activation of the second backup communication path.

20. The system according to claim 14, wherein the switch is arranged to detect a recovery of the failure in the first communication path and to deactivate the second, backup communication path, in response to the recovery being detected.

21. The system according to claim 20, wherein the primary multi-service router is arranged, in response to the recovery in the first communication path, to synchronize the primary multi-service router with the backup multi-service router.

22. The system according to claim 21, wherein the primary multi-service router synchronizes routing information with the backup multi-service router over a synchronization path interposed between the primary multi-service router and the backup multi-service router.

* * * * *